United States Patent [19]
Leis et al.
[11] 3,743,839
[45] July 3, 1973

[54] CONTROL CIRCUIT FOR A TAPE READER

[75] Inventors: Michael D. Leis, Framingham; Robert C. Gray, Cambridge, both of Mass.
[73] Assignee: Digital Equipment Corporation, Maynard, Mass.

[22] Filed: Dec. 3, 1971
[21] Appl. No.: 204,565

[52] U.S. Cl. 250/219 D, 235/61.11 E
[51] Int. Cl. H01j 39/12
[58] Field of Search 250/219 D, 219 DC, 250/219 DD; 235/61.11 R, 61.11 E; 340/222

[56] References Cited

UNITED STATES PATENTS

| | | | |
|---|---|---|---|
| 3,603,950 | 9/1971 | Hartford | 250/219 D |
| 3,542,286 | 11/1970 | Binkley | 235/61.11 E |
| 3,566,085 | 2/1971 | Nagata | 250/219 D |
| 3,222,501 | 12/1965 | Wood | 235/61.11 E |
| 3,558,862 | 1/1971 | McMillan | 235/61.11 E |
| 3,637,991 | 1/1972 | Tanagawa | 250/219 D |

*Primary Examiner*—James W. Lawrence
*Assistant Examiner*—D. C. Nelms
*Attorney*—Robert A. Cesari, George A. Herbster et al.

[57] ABSTRACT

A tape reader. Periodic pulses energize a driving motor to advance a punched tape past a reading device; they also enable a reading operation. Each motor pulse sets a flip-flop circuit. When a detector senses registration of a sprocket hole in the tape with the reader, it generates an output which, if in time coincidence with the flip-flop output, produces a strobing pulse that causes the reading device to sense data on the tape. The strobing pulse immediately resets the flip-flop circuit to inhibit further strobing pulses until the next motor pulse occurs.

3 Claims, 2 Drawing Figures

CONTROL CIRCUIT FOR A TAPE READER

BACKGROUND OF THE INVENTION

This invention generally relates to tape readers used in digital computer systems, and more specifically, to a control circuit for such readers. In the following discussion, I use the phrase "tape reader" to include punched tape, magnetic tape and punched card readers and equivalent devices, even though the specific description is limited to a punched tape reader along. alone.

Punched tape readers generally sense the presence of holes through tape at data positions to generate data bit signals. The tape is arranged schematically with a succession of transverse rows, each row having a set of the predetermined data positions in which holes may or may not be punched. The readers sense the presence of data holes either electromechanically or optically. Electromechanical sensors may include extensible fingers which pass through the holes to close switches or which the tape blocks in the absence of a hole. Two sets of conductive rollers may be disposed on opposite sides of the tape to make contact in the presence of a hole. Optical sensors, on the other hand, rely on the fact that the tape is opaque. As the tape moves between a lamp and a set of photocells arrayed transversely to the tape, each hole transmits light to a corresponding photocell.

As the tape moves successive rows of data holes and intermediate solid tape areas past either kind of a sensor, the sensor outputs are constantly changing, representing, at any given instant, either data or non-meaningful information. Some timing device must control when the sensor is "read." Historically, early readers use an "open-loop" control circuit which generates a pulse to control the time the sensors are strobed and to advance the tape. Open-loop systems assume that the tape driving mechanism registers the data holes with the sensors at the time the strobing pulse occurs. However, this assumption is not always valid because the tape is subject "misalignment" errors as it is read.

A misalignment error occurs when the data holes do not register with the sensors at the time of the strobing pulse. There are two primary sources of misalignment error. All tape is perforated by a tape punch which advances the tape and forms both the sprocket and data holes. These functions require a complex mechanical mechanism which is subject to wear and a wide variation of manufacturing dimensional tolerances. As the mechanism punches and advances the tape, it also introduces operational vibrations. Individually or in combination, these factors can produce erratic tape advances so the resulting punched tape may not contain evenly spaced adjacent rows of data holes.

Similarly, a tape reader, while not subject to all the factors introduced by a tape punch, is subject to wear and vibration, so it may not advance the tape evenly between strobing pulses. As a result, there is no assurance that the strobing pulse will occur while the data row registers with the reading devices. Moreover, electromechanical sensors which extend through the holes, may damage the tape if the tape is misaligned and cause further errors.

Another type of tape reader senses the arrival of the sprocket hole in line with the reading sensors. As the sprocket hole is significantly smaller than the data holes, it is assumed that the data holes register with their respective sensors when the sprocket hole aligns with its sensor. Therefore, the arrival of the sprocket hole at its sensor triggers the strobing pulse which causes the other sensors to be read. However, this control is subject to reading errors caused by "jitter," "fuzziness" and electrical noise.

If the drive motor is a stepping motor, it constantly undergoes intermittent motion and repeated rapid accelerations and decelerations. Under these conditions, the entire tape drive assembly is subject to mechanical resonance and can cause the tape to undergo a transient longitudinal oscillation. This is "jitter." In systems which sense the sprocket hole position, jitter can cause a single row of data holes to be read more than once.

Multiple readings of a single row can also result if the edge of the sprocket hole is "fuzzy." As a tape punch wears or as a tape itself wears after repeated use, the edges of the sprocket holes may become indistinct. That is, fibers may overlie the sprocket hole or the edge of the hole may become irregular. With either jitter or fuzziness, the sprocket hole sensor can "see" what appears to be multiple successive sprocket holes instead of a single sprocket hole. For example, either jitter or a fuzzy sprocket hole can cause significant light transmission variations to a sprocket hole photo sensor. The photocell cannot distinguish between these light transmission variations and those caused by the normal passage of successive sprocket holes.

Electrical noise on the power line or from other sources can also introduce multiple reading errors, especially when a reader senses the sprocket hole optically. If the noise occurs when the light reaching the photocell is at a threshold level, the noise voltage can change the photocell output, even though the light impinging on the photocell does not change. Again, the photocell cannot distinguish this change from that of sprocket holes passing, so it produces multiple strobing pulses. Even if filters are incorporated into the sprocket hole sensors, there are still conditions under which noise, fuzziness or jitter can generate an erroneous reading pulse.

All these problems exist at all operating speeds. In some prior systems, the problems are just accepted and attempts are made to check the reliability or accuracy of the reading. Other systems may interpose a constant time delay between the time the reader receives a motor pulse in hopes that the data holes will be properly aligned after the time delay and that multiple reading errors will be minimized. However, constant time delays are also subject to error during the initial acceleration of the tape when the time between a motor pulse and arrival of data holes is continuously varying.

Therefore, it is an object of this invention to provide a tape reader control which substantially eliminates these reading errors.

Another object of this invention is to provide a control which substantially eliminates tape reader errors caused by misalignment, jitter, fuzziness and electrical noise.

SUMMARY

In accordance with my invention, I use both a motor pulse which advances the tape drive motor through a known rotation and a signal indicating the arrival of a sprocket hole at the reading position to initiate sensing of the data holes. When the pulse occurs, the holes may be registered with the reading position. In this situation, the data is read immediately by generating a strobing pulse. If the holes are displaced from the reading position, the subsequent arrival of the sprocket hole in a row initiates a strobing pulse to read the data. A concurrent strobing pulse with or first strobing pulse after a motor pulse inhibits any further strobing pulses until another motor pulse or known motor rotation has occurred.

With this arrangement, a tape reader cannot read the same line of data holes twice, as could occur in prior readers if the tape were to jitter or the holes were fuzzy. Further, mechanical misalignment problems are overcome because the strobing pulse depends upon a sprocket hole coming into registration with a reading station. As a result, it is possible to increase the reading speed (i.e., the rate of motor pulses) without any significant loss of reading reliability.

This invention is pointed out with particularity in the appended claims. The above and further objects and advantages may be more fully appreciated by referring to the following detailed description taken in conjunction with the accompanying drawings.

DESCRIPTION OF AN ILLUSTRATIVE EMBODIMENT

Figures 1, 2:
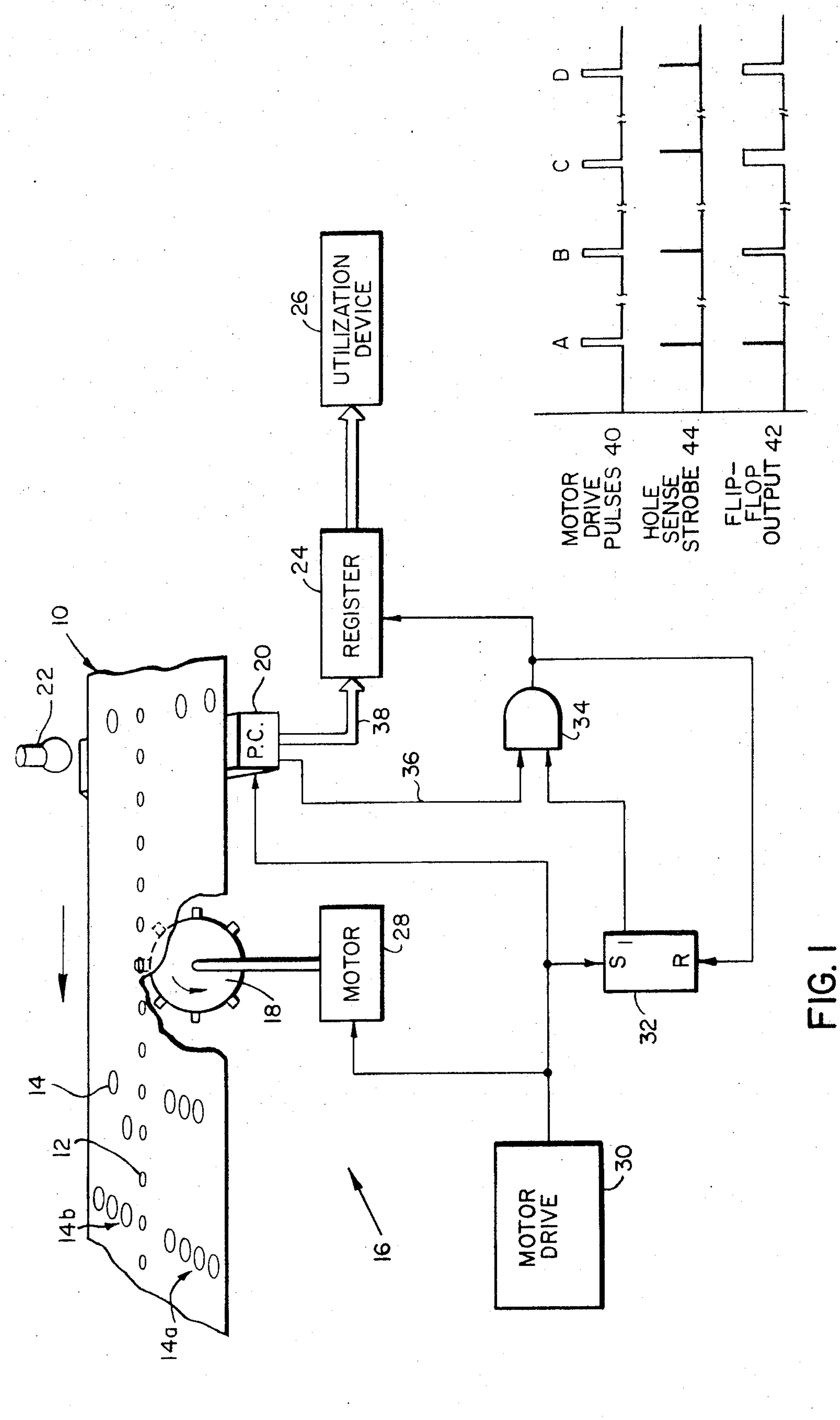
FIG. 1 is a diagram showing a paper tape reader and the control circuitry necessary for implementing this invention.
FIG. 2 is a timing diagram to illustrate a signal sequence which occurs when our invention is implemented.

Referring to FIG. 1, punched tape 10 starts as a continuous elongated tape of paper or other opaque material. A tape punch (not shown) forms a series of sprocket holes 12 and two columns of data holes 14*a* and 14*b*. These columns are disposed on either side of the sprocket holes 12 with one column usually containing five data hole positions and the other, three data hole positions. The individual data holes 14 are larger than are the sprocket holes 12 (usually twice the diameter).

In a punched tape reader 16, a sprocket wheel 18 engages the sprocket holes 12 and advances the tape 10 past a reader, usually by pulling the tape past the reader. As shown in this FIGURE, the reader 20 comprises a photocell array below the tape 10 and light source 22 over the tape. Each cell in the array registers with a corresponding data or sprocket hole position, so the cells are aligned generally traversely to the direction of tape movement, and the tape 10.

A utilization device 26, such as a digital computer, receives data signals from a register 24. A stepping motor 28, driven in response to a succession of pulses from a motor drive 30, produces the step-like tape advance by angularly stepping the sprocket 18 through a fixed angle. Generally, a reading cycle begins with the tape at rest. The motor drive 30 generates a pulse which enables a strobing pulse to sense the holes then at the reading position. Although the pulse from the motor drive 30 also energizes the motor 28, the motor inertia or internal control circuits delay any actual tape motion until the strobing pulse terminates. Then the motor 28 advances the tape to the next position.

In accordance with our invention, each pulse from the motor drive 30 shifts a bistable device 32 to a first state. This enables a following strobing pulse from the photo-cell array 20, indicating the presence of a sprocket hole 12, to gate the register 24. As the strobing pulse gates the register 24, it also returns the bistable device to its original state and prevents any further strobing pulses from the array 20 from gating the register 24.

Now assuming that all signals are positive assertion signals and referring to FIGS. 1 and 2, each positive assertion pulse 40 from the motor drive 30 indicates that the motor has undergone a known rotation and sets an RS flip-flop 32 to enable an AND gate 34 thereby generating signal 42. A coincident or following output pulse (reference numeral 44 in FIG. 2) from the photocell array 20 on the conductor 36 represents the arrival of a sprocket hole 12 over the corresponding cell. The enabled AND gate 34 passes this pulse to the register 24 as a strobing pulse, so the register 24 accepts data from the other photocells in the array 20 over a bus 38. Simultaneously, the output from the AND circuit 34 resets the flip-flop 32 and disables the AND gate 34.

This or any equivalent control circuit enables increased operating speeds to increase for several reasons. Multiple readings from a single hole in prior systems caused by "jitter" or fuzziness in sprocket holes are overcome. There can only be "one" reading of data for each tape advance. As the sprocket hole is much smaller than the data holes and is centered on an axis though the data hole centers in a row, the punched tape reader is assured that the data holes are registered with the photocell array. If the distance from the sprocket to the holes in the tape at the reading station is short because registration problems exist, the reader will read the data immediately upon receipt of a motor pulse as shown in FIGS. 2A and 2B. This situation can result when some of the previous situations exist. Furthermore, it can exist if the tape and tapered pin on the sprocket engage at different locations along the sprocket radius or if the angular rotation in response to each motor pulse is not equal. If the distance between adjacent rows is "long," (FIG. 2B or 2D), the strobing pulse does not occur simultaneously with the motor pulse; it is merely delayed until the sprocket hole arrives at the reading station. These features permit the frequency of the pulses which drive the motor and enable strobing pulses to be increased to produce a faster reading operation and more accurate reading of tapes which do not "register."

As apparent, we have shown a diagram of a specific control circuit which assumes certain logic signal conditions. For example, a reading device might reverse the operating sequence. It could move the tape and then read the next row of data holes appearing over the array. This would require a delay circuit between the motor drive control and the setting input of the flip-flop 32, the delay assuring that the row at the array clears it before the next strobing pulse can occur.

If several motor pulses are required to move the tape from one position to another to bring an adjacent row into a reading position, a counter can be installed in a circuit just ahead of the flip-flop 32 and photocell array 20 to pass a pulse only after the required number of pulses from the motor drive. Furthermore, the control circuit can be adapted to other tape or card machines with appropriate modifications, as by using a magnetized spot on a magnetic tape drive capstan to act as the "sprocket hole" or by sensing timing marks on a timing track.

All of these adaptations and modifications still provide a tape reader which senses the first arrival of a "sprocket hole" during a reading cycle. They combine motion sensing with the data itself. Therefore, it is the object of the appended claims to cover all such variations and modifications as come within the true spirit and scope of this invention.

What we claim as new and desire to secure by Letters Patent of the United States is:

1. In a tape reader including means for advancing a tape past a detection station, the improvement of a control for timing the reading of data at data positions in the tape, said control, comprising:

A. means for generating motor pulses to advance the tape incrementally,

B. gating means enabled by each motor pulse, and

C. means sensing the arrival of data positions at the detection station for generating a strobing signal, said gating means passing the strobing signal in its enabled condition as a reading signal, the reading signal resetting said gating means to thereby disable said gating means until the arrival of the next motor pulse.

2. A tape reader as recited in claim 1 wherein said tape includes a series of sprocket holes, said sensing means including means responsive to the passage of a sprocket hole for generating the strobing signal.

3. In a reader for prepunched tapes with sprocket holes including an optical reader with gated data storage means, means for generating strobing signals in response to the arrival of successive sprocket holes at the reader and means for driving the tape past the reader, a control comprising:

A. means for generating pulses in succession for energizing the driving means,

B. a bi-stable device set to a first tape by each motor drive pulse, and

C. a gate for receiving strobing signals, said gate being enabled by said bistable device in the first for passing the strobing pulse to the data storage means to thereby store data and for resetting said bi-stable device to a second state to thereby disable said gate.

* * * * *